United States Patent
Cha et al.

(10) Patent No.: US 11,031,887 B2
(45) Date of Patent: Jun. 8, 2021

(54) MOTOR CONTROL DEVICE, VEHICLE HAVING THE SAME AND METHOD OF CONTROLLING THE VEHICLE

(71) Applicants: HYUNDAI MOTOR COMPANY, Seoul (KR); KIA MOTORS CORPORATION, Seoul (KR)

(72) Inventors: Jiwan Cha, Incheon (KR); Han Hee Park, Hwaseong-si (KR); JaeHyeon Lee, Hwaseong-si (KR); Seongmin Kim, Changwon-si (KR); Hyunwoo Noh, Seoul (KR); Taeil Yoo, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 60 days.

(21) Appl. No.: 16/528,984

(22) Filed: Aug. 1, 2019

(65) Prior Publication Data
US 2020/0169198 A1    May 28, 2020

(30) Foreign Application Priority Data
Nov. 28, 2018    (KR) .................. 10-2018-0149143

(51) Int. Cl.
*H02P 6/16*    (2016.01)
*H02M 7/5387*    (2007.01)
(Continued)

(52) U.S. Cl.
CPC .......... *H02P 6/16* (2013.01); *H02M 7/53871* (2013.01); *H02P 6/28* (2016.02); *B60K 6/20* (2013.01);
(Continued)

(58) Field of Classification Search
CPC ................................ G01D 5/14; G01D 5/204
See application file for complete search history.

(56) References Cited

U.S. PATENT DOCUMENTS

2007/0291424 A1* 12/2007 Nishimoto ............... G01D 3/08
                                                             361/23
2016/0025796 A1*  1/2016 Kim ...................... G01R 31/50
                                                             324/765.01

(Continued)

FOREIGN PATENT DOCUMENTS

JP     2006-349561 A    12/2016
KR  10-2016-0006056 A    1/2016

*Primary Examiner* — Said Bouziane
(74) *Attorney, Agent, or Firm* — Mintz Levin Cohn Ferris Glovsky and Popeo, P.C.; Peter F. Corless

(57) ABSTRACT

A motor control device includes: a storage configured to store reference Lissajous values; and a controller configured to apply an excitation signal to a resolver; receive an output signal output from the resolver, to obtain a Lissajous value corresponding to the received output signal, to determine that an external noise is input when the obtained Lissajous value is different from the reference Lissajous values, and to control driving of a motor based on the obtained Lissajous value when the obtained Lissajous value is equal to any one of the reference Lissajous values. A vehicle having the motor control device may further include a battery configured to transmit power to the motor and to be charged by regenerative braking of the motor.

18 Claims, 13 Drawing Sheets

(51) Int. Cl.
*H02P 6/28* (2016.01)
*B60L 7/10* (2006.01)
*B60Q 9/00* (2006.01)
*B60W 20/00* (2016.01)
*B60K 6/20* (2007.10)

(52) U.S. Cl.
CPC .................. *B60L 7/10* (2013.01); *B60Q 9/00* (2013.01); *B60W 20/00* (2013.01); *B60Y 2200/92* (2013.01)

(56) References Cited

U.S. PATENT DOCUMENTS

2018/0164132 A1* 6/2018 Lechner ................ G01D 5/2291
2018/0231392 A1* 8/2018 Kiyomura ................ G01D 3/08

* cited by examiner

FIG. 9

| ITEM | | INTERVAL | 0→1 | 1→2 | 2→3(NOISE INPUT) | 2→3 (PREDICT) |
|---|---|---|---|---|---|---|
| LISSAJOUS | | ANGLE | $\Theta_{(0-1)}$ | $\Theta_{(1-2)}$ | $\Theta_{(2-3)\_noise}$ | $\Theta_{(2-3)\_new} = 2\Theta_{(1-2)} - \Theta_{(0-1)}$ |
| | | ANGULAR VELOCITY | $\Theta_{(0-1)}/\Delta t$ | $\Theta_{(1-2)}/\Delta t$ | $\Theta_{(2-3)\_noise}/\Delta t$ | |
| | | ANGULAR ACCELERATION | | $(\Theta_{(1-2)} - \Theta_{(0-1)})/\Delta t^2$ | $(\Theta_{(2-3)\_noise} - \Theta_{(1-2)})/\Delta t^2$ | |
| | PREDICT LISSAJOUS BASED ON ANGULAR ACCELERATION | | | $(\Theta_{(1-2)} - \Theta_{(0-1)})/\Delta t^2 = (\Theta_{(2-3)\_new} - \Theta_{(1-2)})/\Delta t^2$ | | |

$\Delta t$: control period

MOTOR CONTROL DEVICE, VEHICLE HAVING THE SAME AND METHOD OF CONTROLLING THE VEHICLE

CROSS-REFERENCE TO RELATED APPLICATION(S)

This application is based on and claims priority under 35 U.S.C. § 119 to Korean Patent Application No. 10-2018-0149143, filed on Nov. 28, 2018 in the Korean Intellectual Property Office, the disclosure of which is incorporated by reference in its entirety.

TECHNICAL FIELD

Embodiments of the disclosure relate to a motor control device capable of correcting an output signal of a resolver into which noise is introduced and controlling the driving of the motor using the corrected output signal, and a vehicle having the same and a method of controlling the vehicle.

BACKGROUND

Vehicles are machines that drive on roads by driving their wheels.

The vehicles include motor vehicles (internal combustion engine-driven cars) driven with mechanical power produced by burning fuel oil, such as gasoline and diesel, and eco-friendly vehicles driven by electrical power so as to reduce the amount of harmful fuel emissions and increase fuel efficiency.

The eco-friendly vehicles include electric vehicles having a rechargeable power supply comprised of a battery and a motor, rotating the motor with electricity charged in the battery, and driving the wheels using the rotation of the motor; hybrid vehicles having an engine, a battery, and a motor and driven by controlling the mechanical power of the engine and the electrical power of the motor; and hydrogen fuel cell vehicles.

SUMMARY

Therefore, it is an aspect of the disclosure to provide a motor control device capable of correcting an angle of a motor corresponding to an output signal of a resolver distorted by noise using a reference Lissajous value within a reference Lissajous range, and a vehicle having the same and a method of controlling the vehicle.

It is another aspect of the disclosure to provide a motor control device capable of diagnosing a failure of the motor or the resolver based on the number of distortions of the output signal of the resolver, and a vehicle having the same and a method of controlling the vehicle.

Additional aspects of the disclosure will be set forth in part in the description which follows and, in part, will be obvious from the description, or may be learned by practice of the disclosure.

In accordance with an aspect of the disclosure, a motor control device includes: a storage configured to store reference Lissajous values; and a controller configured to: apply an excitation signal to a resolver; receive an output signal output from the resolver; obtain a Lissajous value corresponding to the received output signal; determine that an external noise is input when the obtained Lissajous value is different from the reference Lissajous values; and control driving of a motor based on the obtained Lissajous value when the obtained Lissajous value is equal to any one of the reference Lissajous values.

The controller may count the number of distortions in which the output signal is distorted by the external noise during driving of the motor; and output notification information of an excessive noise input to an external device when the counted number of distortions exceeds a reference number.

The controller may periodically receive the output signal output from the resolver during driving of the motor; sequentially obtain Lissajous values corresponding to the periodically received output signals; obtain an angular acceleration between the adjacent Lissajous values among the sequentially obtained Lissajous values; when a first one of the obtained Lissajous values is different from the reference Lissajous values, identify first and second angular acceleration values that respectively corresponding to the first obtained Lissajous value and a second obtained Lissajous value which is one of the obtained Lissajous values prior to the first Lissajous value; determine one of the reference Lissajous values constituting a reference Lissajous curve based on the identified first and second angular accelerations; recognize an angle of the motor based on the changed Lissajous value; and control the driving of the motor based on the recognized angle of the motor.

The controller may recognize angles between the adjacent Lissajous values among the sequentially obtained Lissajous values when obtaining the angular acceleration between the adjacent Lissajous values among the sequentially obtained Lissajous values; obtain angular velocities between the recognized angles; and obtain the angular acceleration between the recognized angular velocities.

The controller may recognize angles between the adjacent Lissajous values among the sequentially obtained Lissajous values when obtaining the angular acceleration between the adjacent Lissajous values among the sequentially obtained Lissajous values; when two output signals are received from the resolver during normal driving of the motor, convert the two received output signals into a sine signal and a cosine signal by connecting peak points of the two received output signals; digitize the converted sine signal and cosine signal; obtain a position value of a central point of a reference Lissajous based on average values of sine values and cosine values obtained by sampling the digitized sine signal and cosine signal every predetermined period; obtain a radius of the reference Lissajous based on the digitized sine value, the sine value of the obtained position value of the central point, the digitized cosine value, and the cosine value of the obtained position value of the central point; and obtain and store the reference Lissajous curve based on the obtained position value of the central point and the radius.

The controller may obtain the reference Lissajous value constituting the reference Lissajous curve based on the obtained position value of the central point and the radius.

In accordance with another aspect of the disclosure, a vehicle includes: a motor configured to transmit a driving force to wheels; a resolver connected to the motor; and a motor control device configured to: apply an excitation signal to the resolver; receive an output signal output from the resolver; obtain a Lissajous value corresponding to the received output signal; determine that an external noise is input when the obtained Lissajous value is out of a pre-stored reference Lissajous range; and control driving of the motor based on the obtained Lissajous value when the obtained Lissajous value is within the pre-stored reference Lissajous range.

The vehicle may further include: a battery configured to transmit power to the motor and to be charged by regenerative braking of the motor.

The vehicle may further include: a display. The motor control device may count the number of distortions in which the output signal is distorted by the external noise during driving of the motor; and output notification information of an excessive noise input to an external device when the counted number of distortions exceeds a reference number.

The motor control device may determine one of the reference Lissajous values constituting a pre-stored reference Lissajous curve when the counted number of distortions is equal to or less than the reference number; recognize an angle of the motor based on the determined Lissajous value; and control the driving of the motor based on the recognized angle of the motor.

The motor control device may periodically receive the output signal output from the resolver during driving of the motor; sequentially obtain Lissajous values corresponding to the periodically received output signals; obtain an angular acceleration between the adjacent Lissajous values among the sequentially obtained Lissajous values; when the obtained Lissajous value is out of a pre-stored reference Lissajous range, determine one of reference Lissajous values constituting a reference Lissajous curve based on the obtained angular accelerations; and recognize an angle of the motor based on the determined reference Lissajous value.

The motor control device may periodically receive the output signal output from the resolver during driving of the motor; sequentially obtain Lissajous values corresponding to the periodically received output signals; obtain an angular acceleration between the adjacent Lissajous values among the sequentially obtained Lissajous values; identify a first angular acceleration corresponding to the received Lissajous value before any one of the Lissajous values is received when one of the Lissajous values is out of the reference Lissajous range; identify a second angular acceleration corresponding to one of the Lissajous values; when the obtained Lissajous value is out of the pre-stored reference Lissajous range, determine one of reference Lissajous values constituting a reference Lissajous curve based on the identified first and second angular accelerations; recognize an angle of the motor based on the determined reference Lissajous value; and control the driving of the motor based on the recognized angle of the motor.

The motor control device may recognize angles between the adjacent Lissajous values among the sequentially obtained Lissajous values when obtaining the angular acceleration between the adjacent Lissajous values among the sequentially obtained Lissajous values; obtain angular velocities between the recognized angles; and obtain the angular acceleration between the recognized angular velocities.

The motor control device may recognize angles between the adjacent Lissajous values among the sequentially obtained Lissajous values when obtaining the angular acceleration between the adjacent Lissajous values among the sequentially obtained Lissajous values; when two output signals are received from the resolver during normal driving of the motor, convert the two received output signals into a sine signal and a cosine signal by connecting peak points of the two received output signals; digitize the converted sine signal and cosine signal; obtain a position value of a central point of a reference Lissajous based on average values of sine values and cosine values obtained by sampling the digitized sine signal and cosine signal every predetermined period; obtain a radius of the reference Lissajous based on the digitized sine value, the sine value of the obtained position value of the central point, the digitized cosine value, and the cosine value of the obtained position value of the central point; and obtain and store the reference Lissajous curve based on the obtained position value of the central point and the radius.

The motor control device may obtain the reference Lissajous value constituting the reference Lissajous curve based on the obtained position value of the central point and the radius.

In accordance with another aspect of the disclosure, a method of controlling a vehicle, the vehicle including a motor, a resolver, and a battery, the method includes: when an output signal output from the resolver is received during driving of the motor, by a controller, obtaining a Lissajous value corresponding to the received output signal; determining, by the controller, that an external noise is input when the obtained Lissajous value is out of a pre-stored reference Lissajous range; and controlling, by the controller, the driving of the motor based on the obtained Lissajous value when the obtained Lissajous value is within the pre-stored reference Lissajous range.

The determining of that the external noise is input when the obtained Lissajous value is out of the pre-stored reference Lissajous may include counting the number of distortions in which the output signal is distorted by the external noise; and displaying notification information of an excessive noise input to an external device through a display when the counted number of distortions exceeds a reference number.

The determining of that the external noise is input when the obtained Lissajous value is out of the pre-stored reference Lissajous range may include determining one of reference Lissajous values constituting a pre-stored reference Lissajous curve when the counted number of distortions is equal to or less than the reference number; and recognizing an angle of the motor based on the determined reference Lissajous value.

Determining may include periodically receiving the output signal output from the resolver during driving of the motor; sequentially obtaining Lissajous values corresponding to the periodically received output signals; obtaining an angular acceleration between the adjacent Lissajous values among the sequentially obtained Lissajous values; and when the obtained Lissajous value is out of the pre-stored reference Lissajous range, when the obtained Lissajous value is out of the pre-stored reference Lissajous range, identifying the selected reference Lissajous value among the reference Lissajous values constituting the reference Lissajous curve based on the obtained angular accelerations.

The obtaining of the angular acceleration between the adjacent Lissajous values among the sequentially obtained Lissajous values may include recognizing angles between the adjacent Lissajous values among the sequentially obtained Lissajous values; obtaining angular velocities between the recognized angles; and obtaining the angular acceleration between the recognized angular velocities.

Determining may include identifying a first angular acceleration corresponding to the received Lissajous value before the obtained Lissajous values is received; identifying a second angular acceleration corresponding to the obtained Lissajous values; and identifying the selected reference Lissajous value among the reference Lissajous values constituting the reference Lissajous curve based on the identified first and second angular accelerations.

In one embodiment, when determining one of the reference Lissajous values, the controller may select or identify one of the pre-stored reference Lissajous values as the determined reference Lissajous value. In another embodiment, when determining one of the reference Lissajous values, the controller may calculate or compute a reference Lissajous value from the pre-stored reference Lissajous curves as the determined reference Lissajous value.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 9 is a view illustrating an example of angular prediction of a motor control device according to an embodiment;

DETAILED DESCRIPTION

Figure 1:
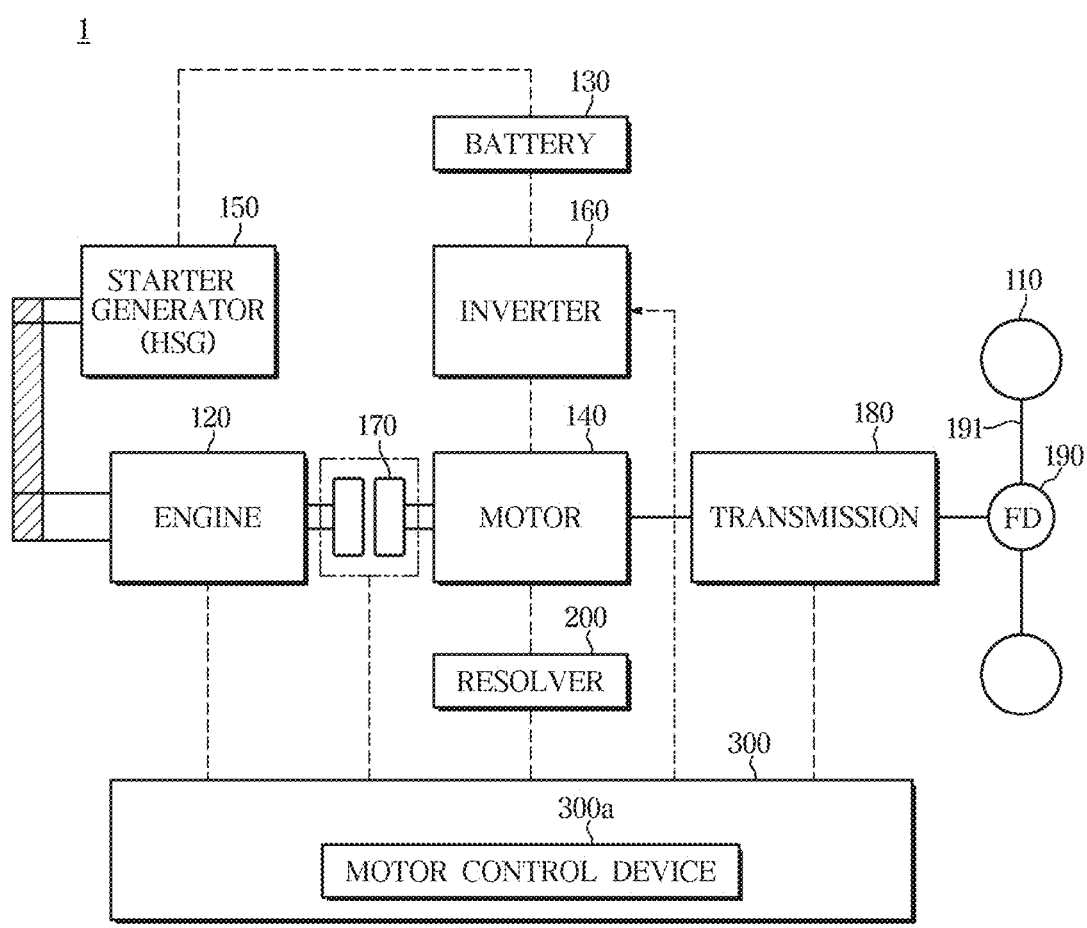
FIG. 1 is a view illustrating a power system of a vehicle having a motor control device according to an embodiment.

Hereinafter, embodiments of the disclosure will be described in detail with reference to the accompanying drawings.

Like reference numerals refer to like elements throughout the specification. Not all elements of the embodiments of the disclosure will be described, and the description of what are commonly known in the art or what overlap each other in the embodiments will be omitted. The terms as used throughout the specification, such as "~ part," "~ module," "~ member," "~ device," "~ block," etc., may be implemented in software and/or hardware, and a plurality of "~ parts," "~ modules," "~ members," "~ devices," or "~ blocks" may be implemented in a single element, or a single "~ part," "~ module," "~ member," "~ device," or "~ block" may include a plurality of elements.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned.

Throughout the specification, when it is said that a member is located "on" another member, it implies not only that the member is located adjacent to the other member but also that a third member exists between the two members.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

Hereinafter, an operation principle and the embodiments of the disclosure will be described with reference to the accompanying drawings.

In implementations of the eco-friendly vehicles, the vehicles may use a Permanent Magnet Synchronous Motor (PMSM) as the motor for driving the vehicle, and a position sensor such as a resolver is required to drive the motor.

A Resolver Digital Converter (RDC) may be used to recognize an angle through an output signal from the resolver, or an Angle Tracking Observer (ATO) may be used to estimate the angle.

When the angle of the motor is recognized, the output signal of the resolver may be distorted due to external noise such as magnetic noise caused by the driving of the motor, radiation noise caused by the driving of an inverter, and electric field noise caused by a leakage current, and the accuracy of the motor angle recognition may be lowered, which may cause the stability of motor control deteriorated.

More particularly, as the resolver's output signal is distorted due to noise, the possibility of error occurrence in torque control is increased by moving the motor control center axis, and an error between a command current and an actual current is generated by increasing a speed ripple during speed control of the motor, thereby increasing the instability of current control and increasing the possibility of an overcurrent due to an angular error of the motor during high current control.

FIG. 1 is a view illustrating a power system of a vehicle according to an embodiment.

A vehicle according to an embodiment is an eco-friendly vehicle, which may be one of an electric vehicle having a rechargeable power device comprised of a battery and a motor, rotating the motor with electricity stored in the battery, and driving wheels using the rotation of the motor, a hybrid vehicle driven by an engine, a battery, and a motor and controlling the mechanical power of the engine and the electrical power of the motor, and a hydrogen fuel cell vehicle.

The hybrid vehicle may include a hybrid vehicle without a plug, i.e., Hybrid Electric Vehicle (HEV), or a hybrid vehicle with a plug, i.e., Plug-in Hybrid Electric Vehicle (PHEV). In the embodiment, the plug-less hybrid vehicle will be focused on as an example.

A vehicle 1 in accordance with the embodiment includes a car body with exterior parts and interior parts, and other parts, i.e., chassis, on which mechanical devices required for driving are installed.

The chassis of the vehicle 1 is a frame to support the car body, having car wheels 110 equipped at the front and rear and on the left and right of the vehicle 1, power systems 120 to 190 to generate power for driving the vehicle 1 and control and apply the generated power to the car wheels 110, a brake system for applying a braking force to the car wheels 110, a steering system, and a suspension system arranged thereon.

The vehicle 1 may further include a hydraulic brake system as the brake system, which generates hydraulic pressure based on a control command of a power control device 300 and uses the hydraulic pressure to apply the braking force to the car wheels 110.

As illustrated in FIG. 1, a power system of the vehicle 1 may include an engine 120, a fuel system, a cooling system, a refueling system, a battery 130, a motor 140, a starter generator 150, an inverter 160, a clutch 170, a transmission 180, and a final reduction and differential gear 190, and further include an actuator for driving the clutch 170.

In the embodiment, a power system having a parallel structure, in which both the engine 120 and the motor 140 are connected to an axle 191 of the vehicle 1 to drive the vehicle 1 at the same time, will be focused on, for example.

The engine 120 may burn fuel oil, such as gasoline and diesel to generate mechanical power, and transfer the power to the clutch 170.

The battery 130 may produce power with a high-tension current, and supply the power to the motor 140, the starter generator 150, and various kinds of electric devices in the vehicle 1.

The battery 130 may be charged by receiving the power supplied from the starter generator 150.

The motor 140 generates a turning force (also called rotation power) using electrical energy from the battery 130, and transmits the turning force to the car wheels 110 to drive the car wheels 110.

Once connected to the engine 120 by the clutch 170, the motor 140 transmits its turning force along with the turning force of the engine 120 to the car wheels 110. The motor 140 may also perform a function of absorbing a shock from closing of the clutch 170 while performing a function of a conventional torque converter.

The motor 140 may operate as a generator in a regenerative braking mode due to braking, deceleration, or low-speed driving, enabling the battery 130 to be charged.

The motor 140 may include a stator 141 having a coil through which a current flows and a rotor 142 having a permanent magnet inserted in the stator 141 and fixed to a rotation shaft 143 of the motor 140.

The starter generator 150, e.g., a Hybrid Starter Generator (HSG), may be connected to a crank shaft of the engine 120, engaged with the crank shaft of the engine 120 and may operate as a starter motor when the engine 120 is started, and may operate as a generator by the engine 120 to enable the battery 130 to be charged when the car wheels 110 are not driven by the engine 120.

In embodiments, the starter generator 150 may act as a generator by the power transmitted through the engine 120, enabling the battery 130 to be charged.

The vehicle 1 may also charge the battery 130 by receiving and using power from a charger located in a parking lot or a charging station.

The power system of the vehicle 1 may further include a power converter for converting the power generated by the starter generator 150 to rechargeable power for the battery 130. The power converter may be a converter.

The power converter may also perform a function to change the direction and output of a current between the starter generator 150 and the battery 130.

The power converter may also convert the power generated by the motor 140 to rechargeable power for the battery 130 and convert the power of the battery 130 to driving power for various devices in the vehicle 1.

The power converter may also perform a function to change the direction and output of a current between the motor 140 and the battery 130.

The inverter 160 may convert the power from the battery 130 to driving power for the motor 140.

The inverter 160 may also convert the power of the battery 130 to driving power for the starter generator 150.

The inverter 160 may output the driving power for the motor 140 based on a target car speed from a user command. The driving power for the motor 140 may be a switching signal to output a current corresponding to the target car speed and a switching signal to output a voltage corresponding to the target car speed. Accordingly, the inverter 160 may include a plurality of switching devices.

The clutch 170 may be arranged between the engine 120 and the motor 140.

The clutch 170 may be closed or locked when both the engine 120 and the motor 140 are used to generate driving power for the car wheels 110, and may be opened by a spring pushed back by the hydraulic pressure produced by driving of the actuator, e.g., a Hydraulic Clutch Actuator (HCA), when the driving power for the car wheels 110 is generated using only the motor 140.

In the EV mode where the vehicle 1 is driven only by the motor 140, the vehicle 1 having the clutch 170 opens the clutch 170 to prevent the motor 140 and the engine 120 from being mechanically connected in order to transmit the rotation of the motor 140 directly to the transmission 180. At this time, the engine 120 may be driven off, and may be driven on while the battery is being charged.

Furthermore, the vehicle 1 closes the clutch 170 when driven by the operation of both the engine 120 and the motor 140 (in the HEV mode), in order for the turning force of the engine 120 to be added to the turning force of the motor 140 and then transmitted to the transmission 180.

Even while the vehicle 1 is driven only by the engine 120, the vehicle 1 closes the clutch 170 for the engine 120 to be rotated together with the motor 140 because the engine 120 needs to be connected to the axle.

The transmission 180 may transmit turning motions of the engine 120 and the motor 140 to the car wheels 110, or transmit a turning motion of the motor 140 to the car wheels 110. The transmission 180 may be a Dual Clutch Transmission (DCT) that uses two clutches to manipulate a gearshift level.

The transmission 180 automatically performs optimal torque conversion by enabling the gearshift level to be automatically manipulated based on the driving speed of the vehicle 1.

The transmission 180 may control the gearshift level based on manipulation of the transmission lever to an up/down-shift level.

The vehicle 1 may further include the final reduction and differential gear (FD) 190 arranged between the transmission 180 and the car wheels 110 to convert revolutions per minute (rpm) of the motor 140 so that the driving speed of the vehicle 1 reaches a target speed.

The target speed as herein used may be a speed corresponding to the pressure on the accelerator pedal or brake pedal.

A resolver 200 is a position detector for detecting the rotation angle of the motor 140.

The resolver 200 may be disposed adjacent to the motor 140 and may be fixed to the rotation shaft 143 of the motor 140.

Figure 2:
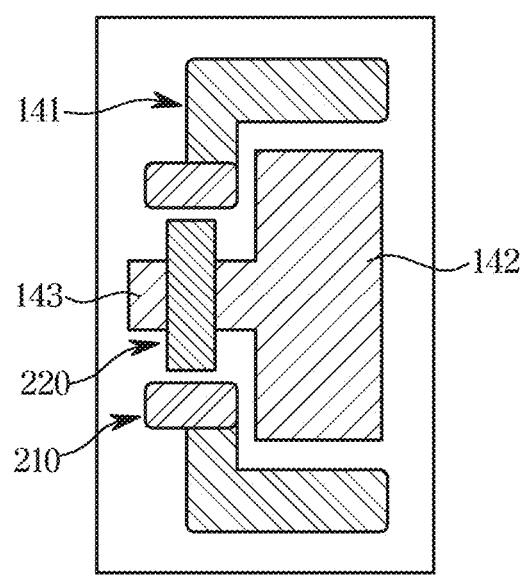
FIG. 2 is a view illustrating a connection between a motor and a resolver of a vehicle having a motor control device according to an embodiment.

As illustrated in FIG. 2, the resolver 200 may include a stator 210 and a rotor 220.

A coil wound on the rotor 220 and the stator 210 of the resolver 200 may be wound so that the magnetic flux distribution is a sinusoidal wave with respect to the angle.

More particularly, when the rotor 220 of the resolver 200 is rotated by the rotation shaft 143 of the motor 140 (i.e., the rotor of the motor) with an excitation signal applied to a primary coil (input terminal) wound on the rotor 220 of the resolver 200, a magnetic coupling coefficient may be changed to generate a signal in which the amplitude of a carrier is varied in a secondary coil (output terminal) wound on the stator 210 of the resolver 200. In one example, the coil may be wound so that the signal changes in the form of a cosine wave and sine wave according to a rotation angle θ of the motor 140 and the rotor 220 of the resolver 200.

In embodiments, the resolver 200 rotates the rotor 220 by the excitation signal when the excitation signal of a several kHz sinusoidal wave is applied, and the primary and secondary side fluxes change periodically by a counter electromotive force when the rotor 220 rotates. At this time, signals of sine sinusoidal waves and cosine sinusoidal waves may be output as output signals.

At this time, the resolver 200 may transmit a voltage corresponding to the rotation angle of the motor 140 to the power control device 300.

The power control device 300 may determine whether a currently required operation is accelerating, braking, slowing down or gear shifting based on at least one of the information about pressure applied on the accelerator pedal, the information about pressure applied on the brake pedal, and gearshift information input to the transmission lever, and the control operation of at least one of the motor 140, the engine 120, the transmission 180, and the hydraulic brake system based on the required operation.

When determining that the vehicle 1 is accelerating, the power control device 300 may obtain the required power of the user based on at least one of current driving speed of the vehicle 1, information about pressure applied to the accelerator pedal, and information about pressure applied to the brake pedal, obtain a target driving speed corresponding to the required power of the user, and control the operation of at least one of the motor 140 and the engine 120 based on the target driving speed.

The power control device 300 may control the vehicle 1 to perform the EV mode using only the power of the motor 140 or the HEV mode using the power of both the motor 140 and the engine 120, based on the target driving speed for the vehicle 1, whether the vehicle 1 is accelerated, and/or whether the vehicle 1 is climbing a hill.

Upon receiving the information about the pressure on the brake pedal, the power control device 300 may obtain the braking power required by a driver based on the speed and frequency at which the brake pedal is pushed, perform reference regenerative braking within a range of the obtained braking power, and complement the rest of the braking power by controlling the hydraulic brake system.

In embodiments, the power control device 300 uses the motor 140 to reduce the speed when less than the reference braking power is required, and controls the hydraulic brake system when more than the reference braking power is required.

When determining that the vehicle 1 is coasting, the power control device 300 may obtain a target braking torque based on a rotation speed of the motor 140 and a gradient of the road, control regenerative braking based on the obtained target braking torque, and control the operation of the hydraulic brake system based on the information about pressure on the brake pedal when the brake pedal is pushed.

When the pressure of the accelerator pedal is released, the power control device 300 may control the operation of the motor 140 to reduce the rotation speed of the motor 140 and control the operation of the transmission 180 to reduce the gearshift level of the transmission 180.

Reducing the gearshift level of the transmission 180 may include increasing a braking torque of the motor 140 to increase the amount of deceleration.

The power control device 300 controls the motor 140 to operate as a generator by controlling the operation of the motor 140 such that the force acting on the motor 140 may work in the counter direction during the regenerative braking.

In embodiments, when the motor 140 is used to generate braking power, the power control device 300 may control the motor 140 to operate as a generator by applying a reverse torque to the motor 140 and controlling the inverter 160 to have a current applied to the motor 140 flowing in the reverse direction. The rotation direction of the motor 140 is not changed due to the inertial force.

The power control device 300 may recognize the rotation angle of the motor 140 based on the output signal of any one of the two output signals of the resolver 200 received by the resolver 200 when the motor 140 is controlled, and control the motor 140 based on the recognized rotation angle of the motor 140 and the target rotation angle. In one example, the power control device 300 may control the on/off operation of a plurality of switch elements in the inverter 160 to control the rotation of the motor 140.

The power control device 300 may include an Engine Control Unit (ECU) for controlling the operation of the starter generator 150 and the engine 120, a motor control device 300a; a Motor Control Unit (MCU), for recognizing the angle of the motor 140 from the output signal of the resolver 200 and controlling the inverter 160 based on the recognized angle of the motor 140 to rotate the motor 140 and perform regenerative braking at the time of braking or slowdown of the vehicle 1; a Local Control Unit (LCU) for controlling the operation of the actuator to open or close the clutch 170, and the main controller; and an HEV Control Unit (HCU), for distributing torque to the engine 120 and the motor 140 based on the target driving speed for the vehicle 1 and outputting control signals to the Engine Control Unit and the Local Control Unit based on the distributed torque.

The main controller, the Engine Control Unit, the motor control device 300a, and the Local Control Unit may be implemented separately or packaged in an integrated single chip.

The main controller, the Engine Control Unit, the motor control device 300a, and the Local Control Unit may be one of a micro controller, a central processing unit (CPU), and a processor. In one embodiment, each of the main controller, the Engine Control Unit, the motor control device 300a, and the Local Control Unit may include one or more processors. In another embodiment, at least two of the main controller, the Engine Control Unit, the motor control device 300a, and the Local Control Unit may be implemented in a single processor.

The motor control device 300a may be implemented with a memory storing an algorithm to recognize the angle of the motor 140 from the output signal of the resolver 200 and control the speed of the motor 140 based on the recognized angle of the motor 140 or data about a program that implements the algorithm, and a processor carrying out the aforementioned operation using the data stored in the memory. The memory and the processor may be implemented in separate chips. Alternatively, the memory and the processor may be implemented in a single chip.

The motor control device 300a will be described with reference to FIG. 3.

Figure 3:
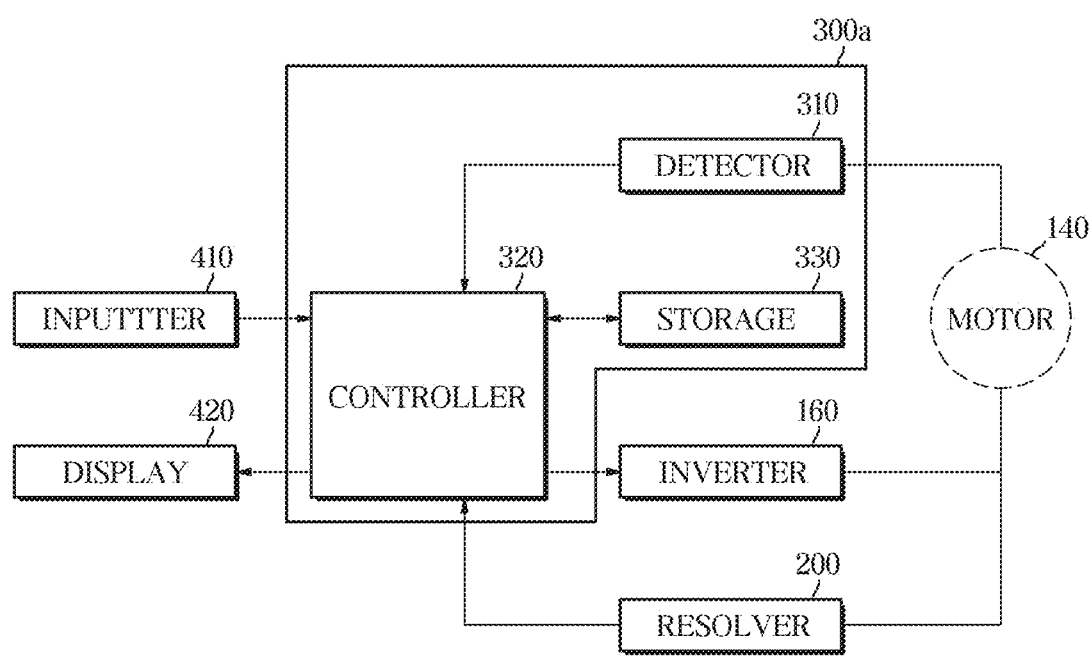
FIG. 3 is a control block diagram of a vehicle having a motor control device according to an embodiment.
Figure 4:
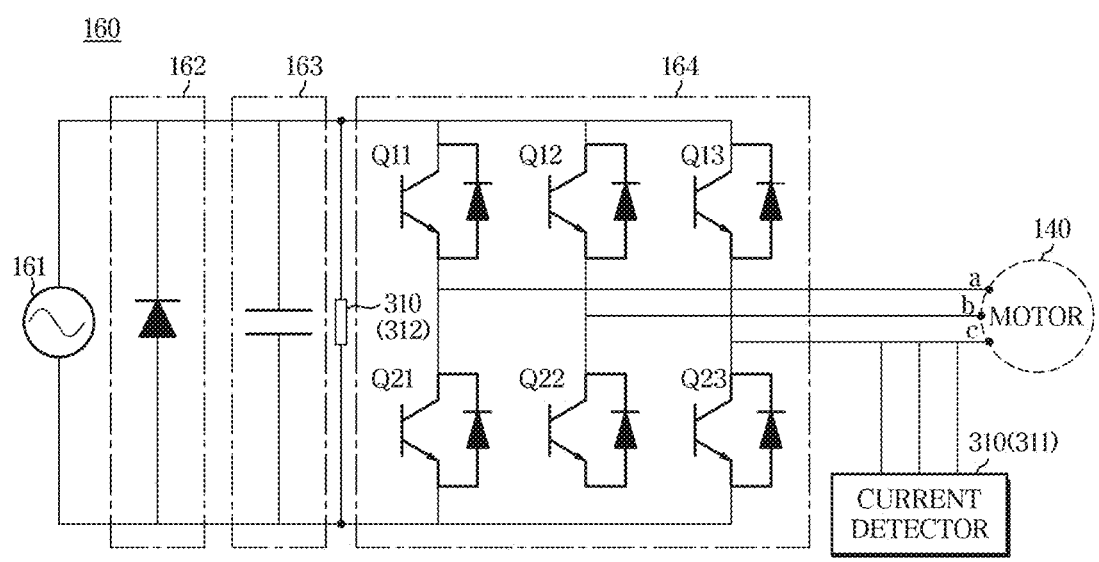
FIG. 4 is a view illustrating an inverter driven by a motor control device according to an embodiment.
Figure 5:
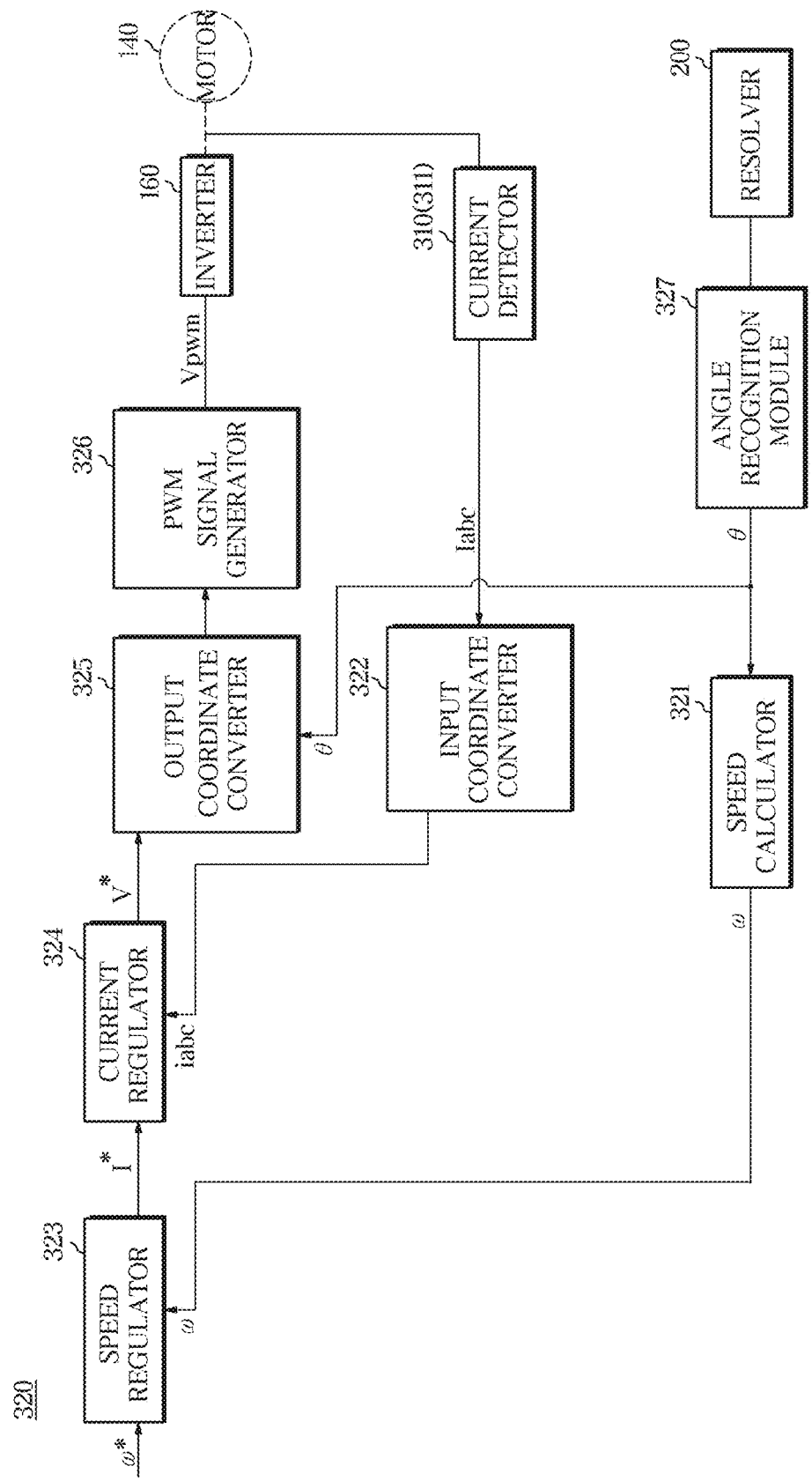
FIG. 5 is a detailed configuration diagram of a controller in a motor control device according to an embodiment.

FIG. 3 is a control block diagram of a vehicle having a motor control device according to an embodiment, with reference to FIGS. 4 to 5. FIG. 4 is a detailed configuration diagram of an inverter illustrated in FIG. 3, and FIG. 5 is a detailed configuration diagram of a controller of a motor control device illustrated in FIG. 3.

As illustrated in FIG. 3, the vehicle 1 may include the motor 140, the inverter 160, the resolver 200, the motor control device 300a, an inputter 410, and a display 420.

The motor 140 applies a driving force to the wheels so that it can receive a driving signal from the inverter 160 controlled by the motor control device 300a and can drive it by the received driving signal.

As illustrated in FIG. 4, the inverter 160 may drive the motor 140 based on a control command of the motor control device 300a.

In embodiments, the inverter 160 may generate a driving current of the motor 140 according to a control command of the controller 320 of the motor control device 300a so that the motor 140 can generate the driving force.

The inverter 160 may include a power supply 161, a rectifier 162, a smoother 163, and a plurality of switching elements Q11 to Q13 and Q21 to Q23.

The power supply 161 may be connected to an external power source, receive commercial AC power from the outside, and transmit the AC power to the rectifier 162.

The smoother 163 may include at least one capacitor. The smoother 163 may smooth the power source transmitted from the rectifier 162 to lower a ripple current of the power source rectified in the rectifier 162, convert DC power of a predetermined size for driving the motor 140, and transmit the DC power to the plurality of switching elements Q11 to Q13 and Q21 to Q23.

The inverter 160 may include the plurality of switching elements Q11 to Q13 and Q21 to Q23 for converting the DC power supplied from the smoother 163 into three-phase AC power.

The plurality of switching elements Q11 to Q13 and Q21 to Q23 may be respectively driven according to the control command of the controller 320 to modulate a pulse width transmitted to the motor 140.

The plurality of switching elements Q11 to Q13 and Q21 to Q23 may include the three upper switching elements Q11 to Q13 and the three lower switching elements Q21 to Q23.

The three upper switching elements Q11 to Q13 and the three lower switching elements Q21 to Q23 may be connected in series. In embodiments, the first upper switching circuit Q11 may be connected in series on a U-stage with the first lower switching circuit Q21, the second upper switching circuit Q12 may be connected in series with the second lower switching circuit Q22 on a V-stage, and the third upper switching circuit Q13 may be connected in series with the third lower switching circuit Q23 on a W-stage. Also, diodes may be connected in parallel with the U-stage, the V-stage, and the W-stage.

Three nodes to which the three upper switching circuits Q11 to Q13 and the three lower switching circuits Q21 to Q23 are respectively connected may be connected to three input terminals a, b, and c of the motor 140, respectively. Accordingly, the current may be supplied to the motor 140 through the three input terminals a, b, and c.

The inverter 160 may turn on/off the plurality of switching elements Q11 to Q13 and Q21 to Q23 of the inverter 160 based on a control signal VPWM output from the controller 320.

The motor control device 300a may include a detector 310, the controller 320, and a storage 330.

The detector 310 may include a current detector 311 (see FIG. 4) for detecting the current applied to the motor 140.

The current detector 311 may detect the current applied to the motor 140 through at least one input terminal among three-phase input terminals of the motor 140, and output a signal corresponding to the detected current.

The detector 310 may further include a voltage detector 312 (see FIG. 4) for detecting a voltage applied to both ends of the motor 140. The voltage detector 312 may detect a DC voltage at both ends of the DC voltage provided in the inverter 160.

The controller 320 may control the overall operation of the motor 140.

The controller 320 may control the operation of the motor 140 so that the vehicle 1 is accelerated, decelerated, braked or stopped when the vehicle 1 is running.

The controller 320 may receive the current supplied to the motor 140 detected by the current detector 311 during the speed control of the motor 140 and control the speed of the motor 140 based on a comparison result between the detected current and a target current.

The configuration of the controller 320 for controlling the speed of the motor 140 will be described with reference to FIG. 5.

As illustrated in FIG. 5, the controller 320 may include a speed calculator 321, an input coordinate converter 322, a speed regulator 323, a current regulator 324, an output coordinate converter 325, a PWM signal generator 326, and an angle recognition module 327.

The speed calculator 321 may obtain a rotational speed $\omega$ of the motor 140 based on an angle $\theta$ of the rotor 142 recognized by the angle recognition module 327.

The input coordinate converter 322 may convert currents a, b, and c detected by the current detector 311 into a d-axis current and a q-axis current based on the angle $\theta$ of the rotor 142 of the motor 140.

The speed regulator 323 may compare a target speed $\omega^*$ (or speed command) input from the outside with the rotational speed $\omega$ of the motor 140 and output a current command I* according to the comparison result.

The speed regulator 323 may include a proportional controller P, a proportional integral controller PI, or a proportional integral derivative controller PID.

The current regulator 324 may compare the current command I* output from the speed regulator 323 with a current Iabc of the motor 140 and output a voltage command V* according to the comparison result.

The current regulator 324 may compare a q-axis current command output from the speed regulator 323 with a q-axis current of the motor 140, output a q-axis voltage command according to the comparison result, obtain a d-axis current command based on the rotational speed ω of the motor 140 and the angle θ of the rotor 142, compare the d-axis current command with the d-axis current of the motor 140, and output a d-axis voltage command is output according to the comparison result.

Here, the d-axis current may be the current of a magnetic flux component, and the q-axis current may be the current of a torque component.

The current regulator 324 may also include a proportional controller, a proportional integral controller, or a proportional integral derivative controller.

The output coordinate converter 325 may convert the d-axis voltage command and the q-axis voltage command into a-phase, b-phase and c-phase voltage commands Vabc* based on the angle θ of the rotor 142.

The PWM signal generator 326 may generate the control signal VPWM to be provided to the inverter 160 based on the a-phase, b-phase and c-phase voltage commands Vabc*.

Particularly, the PWM signal generator 326 may output the control signal VPWM for turning on/off the plurality of switching circuits Q11 to Q13 and Q21 to Q23 of the inverter 160 by pulse width modulation (PWM) of the a-phase, b-phase and c-phase voltage commands Vabc*.

The angle recognition module 327 may recognize the angle of the motor 140 (e.g., the rotation angle of the motor) based on the output signal output from the resolver 200. The angular recognition configuration of the motor 140 in the angle recognition module 327 in the controller 320 will be described later.

The controller 320 may convert an a-phase, b-phase, and c-phase of the motor 140 into d-axis and q-axis currents to control the operation of the motor 140.

Particularly, the controller 320 may convert the a-phase, b-phase and c-phase currents of the motor 140 into d-axis and q-axis currents and convert the a-phase, b-phase and c-phase voltages into d-axis and q-axis voltages.

Here, the d-axis may refer to an axis in the direction coinciding with the direction of the magnetic field generated by the rotor 142 of the motor 140, and the q-axis may refer to an axis in the direction 90 degrees ahead of the direction of the magnetic field generated by the rotor 142. Here, the 90 degrees may refer to an electrical angle obtained by converting an angle between adjacent N poles included in the rotor 142 or an angle between adjacent S poles included in the rotor 142 to 360 degrees, not a mechanical angle of the rotor 142.

The controller 320 generates the pulse width modulated signal VPWM based on the current Iabc detected by the current detector 311, the rotational speed ω of the rotor 142, and the voltage command Vabc* output from the output coordinate converter 325.

In embodiments, the controller 320 may obtain the current command to be applied to the motor 140 based on the rotational speed ω of the motor 140 and the detected current Iabc, obtain the voltage command to be applied to the motor 140 based on the current command, and generate the pulse width modulation (PWM) signal VPWM based on the obtained voltage command.

The controller 320 may control the current applied to the motor 140 by controlling the on/off state of the inverter 160 of the driver based on the PWM signal and cause the motor 140 to rotate at a speed corresponding to the controlled current.

When recognizing the angle of the motor 140 for controlling the speed of the motor 140, the controller 320 may control the driving of the resolver 200, determine the influx of noise based on the output signal of the received resolver 200, maintain the angle of the motor 140 corresponding to the output signal of the resolver 200 or change the angle of the motor 140 corresponding to the output signal of the resolver 200 in accordance with whether the noise is introduced or not.

Figure 6:
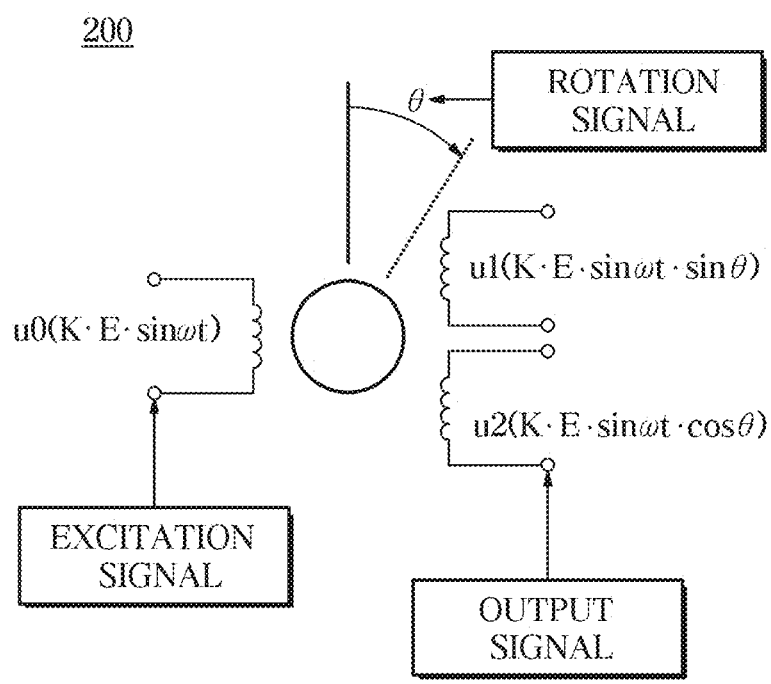
FIG. 6 is a view illustrating an input/output of a resolver of a vehicle having a motor control device according to an embodiment.
Figure 7:
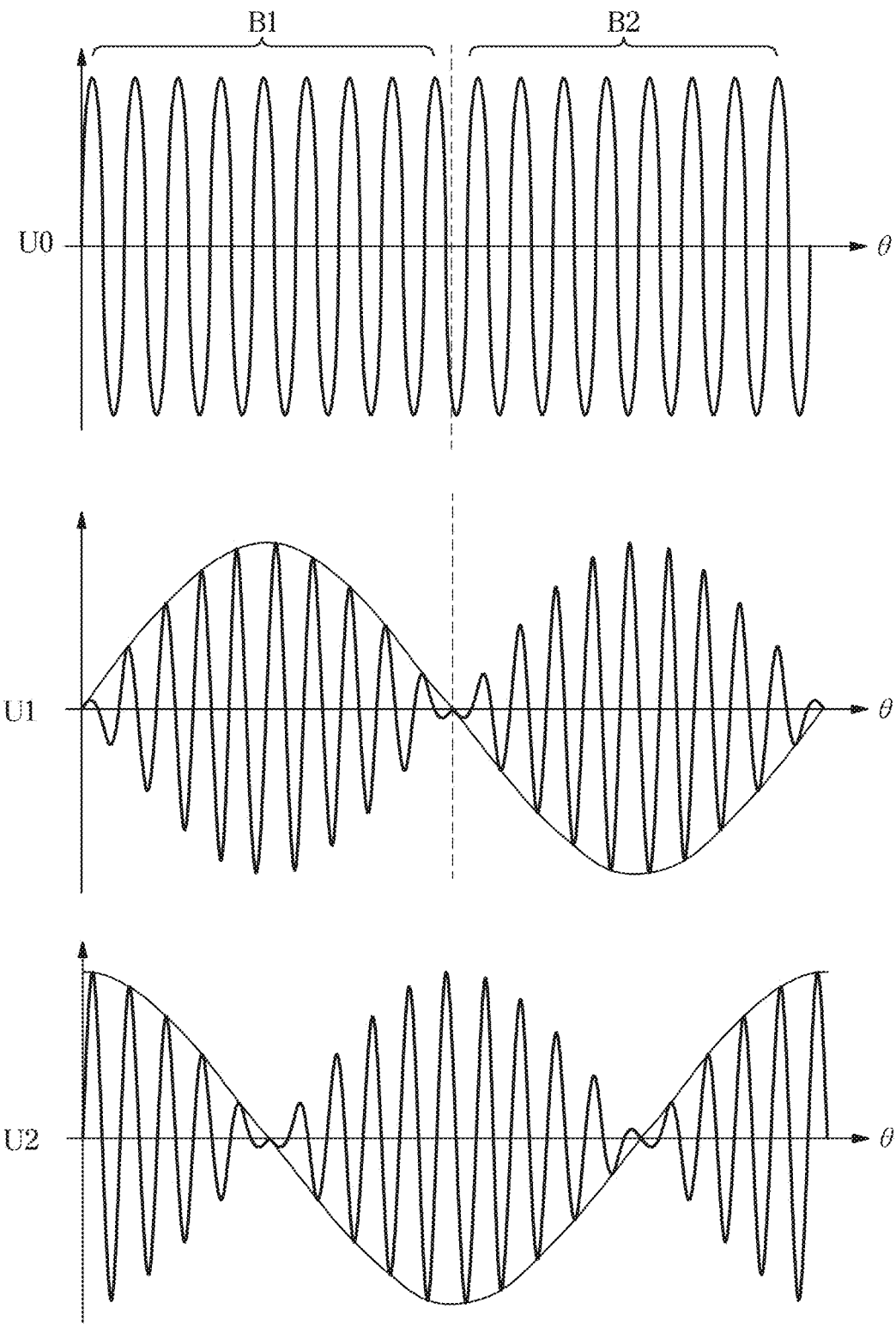
FIG. 7 is a view illustrating waveform of input/output signals of the resolver illustrated in FIG. 6.

The angle recognition configuration of the motor 140 of the controller 320 will be described in more detail with reference to FIGS. 6 to 8.

The controller 320 may generate an excitation signal U0 of the sinusoidal wave having a predetermined reference frequency as a sine-shaped voltage signal and apply the sinusoidal voltage signal to the primary coil wound on the rotor 220 of the resolver 200.

The controller 320 may receive the output signal of the resolver 200 and obtain a Lissajous value corresponding to the received output signal.

Here, the output configuration of the output signal of the resolver 200 will be briefly described.

When the excitation signal is applied to the primary coil, the resolver 200 may output a sine-shaped output signal U1 and a cosine-shaped output signal U2 from the secondary coil wound on the stator 210 by the excitation signal. Here, the output signals U1 and U2 may be voltage signals.

In the resolver 200, a flux linkage due to the change in reluctance due to the rotation of the rotor 220 may be periodically changed. At this time, the amplitudes of the output signals U1 and U2 output from the secondary coils of the stator 210 of the resolver 200 may change according to the rotation angle θ of the motor 140.

The controller 320 may connect the peak points of the received output signals U1 and U2 with an envelope through a Resolver Digital Converter (RDC) to convert a sine signal and a cosine signal representing an absolute angle of the motor 140.

The controller 320 may convert each of the cosine signal and the sine signal input to an analog voltage signal into a digital signal, and may sample values of each signal at a predetermined sampling period from the digitized cosine signal and output the sampled values. Here, the values of the cosine signal and the sine signal converted into the digital value may be a decimal value.

The controller 320 may obtain a cosine value and a sine value converted into the digital value as coordinate values. Here, the coordinate values of the obtained cosine value and sine value may be referred to as obtained Lissajous values.

The controller 320 may compare the obtained Lissajous value with the reference Lissajous value and determine whether the obtained Lissajous value is equal to the reference Lissajous value. When it is determined that the obtained Lissajous value is equal to the reference Lissajous value, the controller 320 may determine that a normal output signal is received from the resolver 200. When it is determined that the obtained Lissajous value is different from the reference Lissajous value, the controller 320 may determine that an output signal distorted by the noise is received from the resolver 200.

When it is determined that the obtained Lissajous value is different from the reference Lissajous value, the controller 320 may determine whether a difference value between the obtained Lissajous value and the reference Lissajous value exceeds a constant value. When it is determined that the difference value is equal to or less than the constant value, the controller 320 may recognize the angle of the motor 140 based on the obtained Lissajous value. Here, the controller 320 may compare the absolute value of the difference value with the constant value.

In addition, the constant value is a coordinate value, and may include the constant value as a cosine axis and the constant value as a sine axis.

The controller 320 may determine that it is difficult to secure the stability of the motor control due to the noise when it is determined that the difference value between the obtained Lissajous value and the reference Lissajous value exceeds the constant value.

In addition, the controller 320 may compare the obtained Lissajous value with the reference Lissajous value and determine that the output signal is normally received when it is determined that the obtained Lissajous value is within a reference Lissajous value range.

The controller 320 may determine that the noise has been received when it is determined that the obtained Lissajous value has exceeded the reference Lissajous range.

Here, the reference Lissajous value and the reference Lissajous range may be previously obtained and stored by experiments.

The configuration of the controller 320 for obtaining the reference Lissajous value and the Lissajous reference range will be described.

The controller 320 may connect the peak points of the received output signals U1 and U2 in a steady state of the motor 140 and the resolver 200 with an envelope through the Resolver Digital Converter (RDC) to convert a sine signal and a cosine signal representing an absolute angle of the motor 140.

The controller 320 may convert the cosine signal and the sine signal input to the analog voltage signal into digital signals, respectively, and sample the values of the signals from the digitized cosine signal and the sine signal at a predetermined sampling period.

The values of the cosine signal and the values of the sine signal converted into the digital value may be the decimal value.

The signal value extracted from the digitized cosine signal at every predetermined sampling period may be referred to as the 'cosine value,' and the signal value extracted from the digitized sine signal at the same point in time and at a sampling period may be referred to as the 'sine value.'

The controller 320 may obtain the sampled values for the two signals, i.e., an average value of the cosine values and the sine values. At this time, the controller 320 may obtain the average value of cosine values and sine values for the predetermined time.

Here, the average value may be a value obtained by averaging the values of the cosine signal and may be a value obtained by averaging the values of the sine signal. The average value of the cosine signal values and the average value of the sine signal values when the motor 140 and the resolver 200 are both normal may be the same specific value. The focus of resolver Lissajous may be to use the cosine average value and the sine average value as coordinate values.

The controller 320 may calculate the average value obtained by averaging the cosine values for the predetermined time (hereinafter, referred to as the 'cosine average value') and the average value obtained by averaging the sine values during the same time (hereinafter, referred to as the 'sine average value').

The cosine average value and the sine average value obtained in this way are the coordinates of a central point (central point value) in the Lissajous of the resolver signal. The cosine average value is an X axis (horizontal axis) coordinate value of the central point, and the sine average value is a Y axis (vertical axis) coordinate value of the central point.

The controller 320 may obtain a position value of a Lissajous midpoint by obtaining the cosine average value and the sine average value respectively and using the average values as the X axis coordinate value and the Y axis coordinate value, respectively.

The controller 320 may obtain a magnitude of the Lissajous, e.g., a radius R of the Lissajous, using the X axis coordinate value (which is the cosine average value) of the central point and the Y axis coordinate value of the central point (which is the sine average value). At this time, the controller 320 may obtain a radius using both the cosine value and the sine value together with the X axis and Y axis coordinate values of the central point, and obtain a diameter based on the obtained radius.

Here, the radius R of the Lissajous may be obtained by applying a square root to the sum of a square of the difference between the digitized cosine value and the cosine average value as the X axis coordinate value of the central point and a square of the difference between the digitized sine value and the sine average value as the Y axis coordinate value of the central point.

Figure 8:
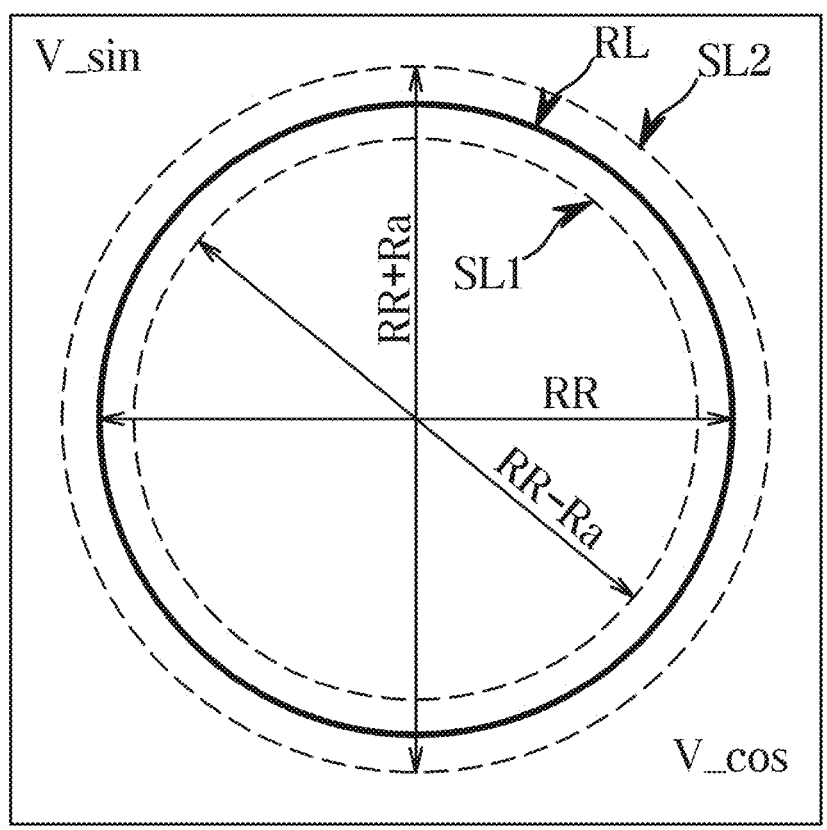
FIG. 8 is a view illustrating a reference Lissajous curve stored in a motor control device according to an embodiment.

FIG. 8 is a view illustrating a reference Lissajous curve of the steady state of the motor and the steady state of the resolver. In FIG. 8, the horizontal axis (X axis) of the coordinate axes represents the sine value, and the vertical axis (Y axis) of the coordinate axes represents the coordinate plane.

Here, the reference Lissajous curve has reference Lissajous values.

In embodiments, the X axis coordinate value at each point in the reference Lissajous curve becomes the cosine value, the Y axis coordinate value at each point becomes the sine value, and the X axis coordinate value and the Y axis coordinate value at one point are the cosine value and the sine value at the same time.

As illustrated in FIG. 8, the reference Lissajous curve of the steady state of the motor and the resolver may be circular and the reference Lissajous value (i.e., reference coordinate value) of one point at a circular border has the sine value and the cosine value.

The reference Lissajous values may be coordinate values of the points constituting a reference circular border RL having a reference diameter RR.

The reference Lissajous range may include a circular border SL1 having a diameter RR−Ra that is smaller by a constant value Ra than the diameter RR of the reference Lissajous curve RL (i.e., border of the circle) and a circular border SL2 having a diameter RR+Ra that is larger by the constant value Ra than the diameter RR of the reference Lissajous curve RL.

In embodiments, the controller 320 may obtain a reference Lissajous map of coordinate values within the area between the circular borders SL1 and SL2 and store the obtained reference Lissajous map.

The controller 320 may obtain the angular value of the motor 140 corresponding to the reference Lissajous values and store the angular values of the motor 140 corresponding to the obtained reference Lissajous values.

When the output signal distorted by the noise is received, the configuration of the controller 320 for recognizing the angle based on the reference Lissajous value will be described.

The controller 320 may obtain the Lissajous values corresponding to the output signals received at a predetermined period, recognize the Lissajous points corresponding to the obtained Lissajous values, recognize the angle between the sequentially recognized points at the predetermined period, obtain an angular velocity between the recognized angles, and obtain an angular acceleration between two adjacent angular velocities.

When the output signal distorted by the noise is received, the controller 320 may recognize the angle of the motor 140 corresponding to the output signal distorted by the noise based on the angular acceleration based on the Lissajous value corresponding to the output signal distorted by the noise and a previously obtained angular acceleration.

Here, the previously obtained angular acceleration is an angular acceleration based on the Lissajous value corresponding to the received output signal just before the output signal distorted by the noise is received.

Recognizing the angle of the motor 140 corresponding to the output signal distorted by the noise may be to predict the angle of the motor 140 corresponding to the output signal distorted by the noise. This will be described with reference to FIGS. 9, 10, 11A and 11B.

Figure 10:
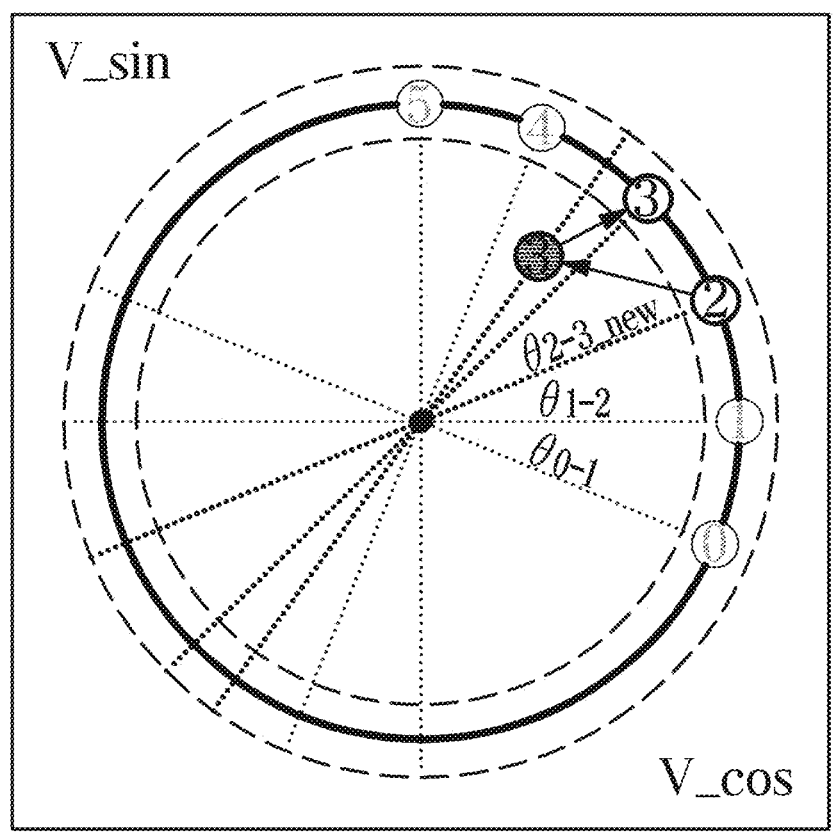
FIG. 10 is a view illustrating an example of angular prediction of a motor due to a Lissajous value when the motor is controlled at a constant speed by a motor control device according to an embodiment.

As illustrated in FIGS. 9 and 10, the controller 320 may recognize a first point '1' having the Lissajous value corresponding to the output signal received at a first point, recognize a first angle $\theta_{0-1}$ between the recognized first point '1' and an initial point '0', and obtain a first angular velocity $\theta_{0-1}/\Delta t$ of the recognized first angle.

The controller 320 may recognize a second point '2' having the Lissajous value corresponding to the output signal received at a second point of the next period, recognize a second angle $\theta_{1-2}$ between the recognized second point '2' and the first point '1', obtain a second angular velocity $\theta_{1-2}/\Delta t$ between the first angle and the second angle, and obtain a first angular acceleration $(\theta_{1-2}-\theta_{0-1})/\Delta t$ between the first angular velocity and the second angular velocity.

The controller 320 may recognize a third point '3' having the Lissajous value corresponding to the output signal received at a third point of the next period, recognize a third angle $\theta_{2-3}$ between the recognized third point '3' and the second point '2', obtain a third angular velocity $\theta_{2-3}/\Delta t$ between the second angle and the third angle, and obtain a second angular acceleration $(\theta_{2-3}-\theta_{1-2})/\Delta t$ between the second angular velocity and the third angular velocity.

In this manner, the controller 320 may obtain the angles, angular velocities, and angular accelerations for each period, and when it is determined that the output signal distorted by the noise is received, the controller 320 may obtain the position of a new third point based on at least two angular accelerations obtained at the adjacent point from the point of time when the distorted output signal is received and change the position of the third point corresponding to the distorted output signal to the position of the new third point.

Here, the position of the new third point may be any point on the curve of the reference Lissajous.

The controller 320 may identify the Lissajous value of the new third point and predict the angle of the motor 140 based on the identified Lissajous value. The identified Lissajous values may be digitized cosine values and digitized sine values.

As illustrated in FIG. 9, when it is determined that the Lissajous value of the third point '3' is out of the reference Lissajous range, the controller 320 may identify a new Lissajous value corresponding to the distorted output signal based on the at least two angular accelerations and reference Lissajous curve obtained at the adjacent point in the third point and predict the angle of the motor 140 based on the identified Lissajous value.

In embodiments, when it is determined that the output signal distorted by the noise is received, the controller 320 may predict the Lissajous value corresponding to the output signal of the resolver 200 at the time the distorted output signal is received as the amount of change in the angular velocity at the points corresponding to the reference Lissajous curve and the previously recognized Lissajous values.

As illustrated in FIG. 10, when the constant speed control of the motor 140 is performed, the amount of change in the angular velocity of each point of the Lissajous curve obtained periodically may be zero. In embodiments, a magnitude of the angular acceleration obtained periodically may be zero.

Therefore, an interval between the points having the Lissajous value corresponding to the output signal of the resolver 200 periodically received may be the same.

Figure 11A:
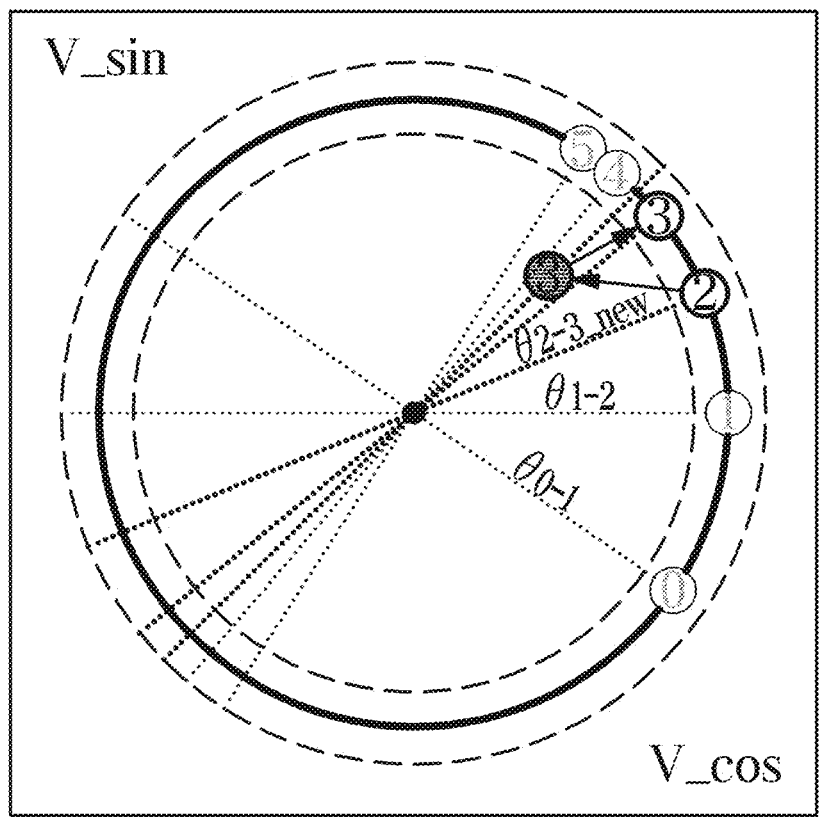
FIG. 11A is a view illustrating an example of angular prediction of a motor due to a Lissajous value in acceleration control of the motor by a motor control device according to an embodiment.

As illustrated in FIG. 11A, when the acceleration control of the motor 140 is performed, the amount of change in the angular velocity of each point of the Lissajous curve obtained periodically may be increased. In one example, the magnitude of the angular acceleration obtained periodically may be increased.

As a result, the interval between the points having the Lissajous value corresponding to the output signal of the resolver 200 periodically received may become narrower as the angular acceleration increases.

Figure 11B:
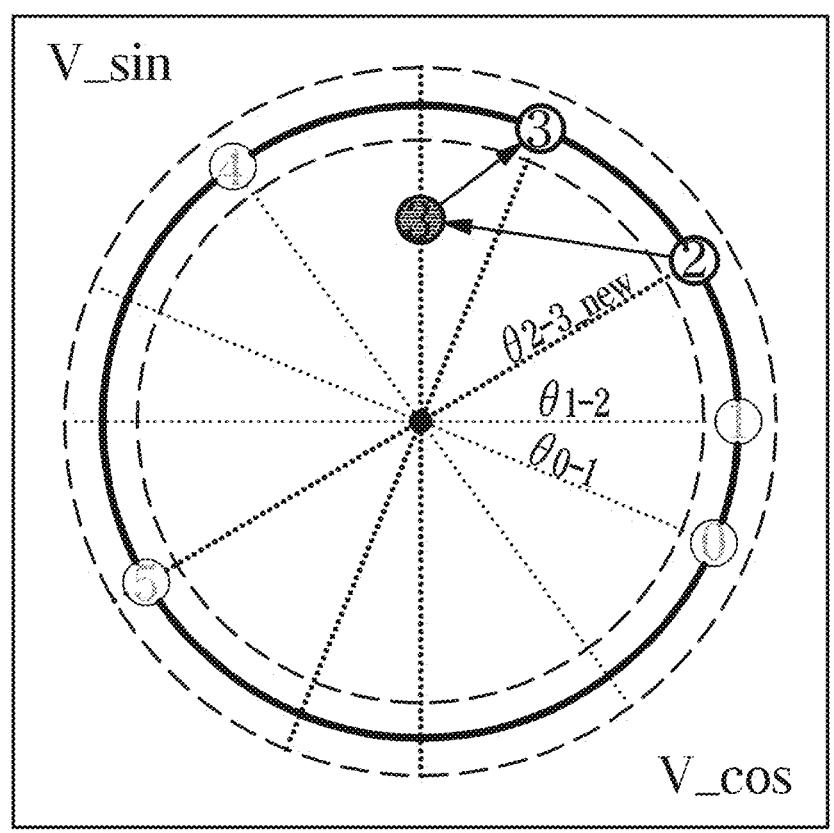
FIG. 11B is a view illustrating an example of angular prediction of a motor due to a Lissajous value in deceleration control of the motor by a motor control device according to an embodiment.

As illustrated in FIG. 11B, when the deceleration control of the motor 140 is performed, the amount of change in the angular velocity of each point of the Lissajous curve obtained periodically may be decreased. In one example, the magnitude of the angular acceleration obtained periodically may be decreased.

Therefore, the interval between the points having the Lissajous value corresponding to the output signal of the resolver 200 periodically received may become wider as the angular acceleration decreases.

As illustrated in FIG. 10, when the constant speed control of the motor 140 is performed, the interval between the third point and the second point where the position is changed by the noise may be equal to the interval between the initial point and the first point, and may be equal to the interval between the first point and the second point.

As illustrated in FIG. 11A, when the acceleration control of the motor 140 is performed, the interval between the third point and the second point where the position is changed by the noise may be narrower than the interval between the initial point and the first point, and may be narrower than the interval between the first point and the second point.

As illustrated in FIG. 11B, when the deceleration control of the motor 140 is performed, the interval between the third point and the second point where the position is changed by the noise may be wider than the interval between the initial point and the first point, and may be wider than the interval between the first point and the second point.

In this way, when it is determined that the output signal distorted by the noise is received even during the acceleration or deceleration control of the motor 140, the controller 320 may sequentially recognize the angles between the points in the Lissajous curve by the predetermined period based on the Lissajous value of the output signal received in each predetermined period, predict the angle of the motor 140 corresponding to the output signal distorted by the noise based on the angular velocity and the angular acceleration of the sequentially recognized angles, and control the speed of the motor 140 based on the predicted angle of the motor 140.

The controller 320 may control the speed of the motor 140 based on the recognized angle even when the output signal distorted by the noise is received.

The controller 320 may count the number of distortions of the output signal of the resolver 200 and output failure information corresponding to the excessive external noise input when the counted number of distortions exceeds a reference number.

The vehicle 1 may further include a detector for detecting load information of the road. In one example, the vehicle 1 may further include a friction force detector for detecting the friction force of the road, and a tilt angle detector for detecting a tilt angle of the road.

The controller 320 may accumulate and store the driver's operation pattern, predict the behavior of the vehicle 1 using the stored operation pattern and road information of the road, and update the corresponding reference Lissajous map (V_cos, V_sin).

In addition, the controller 320 may periodically receive the output signals from the resolver 200 during driving of the motor 140, sequentially obtain the Lissajous values corresponding to the output signals periodically received, obtain the angular acceleration between the adjacent Lissajous values among the sequentially obtained Lissajous values, change the Lissajous value corresponding to the received output signal to the reference Lissajous value of one of the reference Lissajous values constituting the reference Lissajous curve based on the obtained angular acceleration when the output signal of the next period is received, and recognize the angle of the motor 140 based on the changed Lissajous value.

The storage 330 may store the reference Lissajous values.

The storage 330 may store angular values of the motor 140 corresponding to the reference Lissajous values.

The storage 330 may also store a reference number for failure diagnosis.

The storage 330 may also store the reference Lissajous map corresponding to the reference Lissajous range.

The storage 330 may be implemented with at least one of a non-volatile memory device, such as a cache, Read Only Memory (ROM), Programmable ROM (PROM), Erasable Programmable ROM (EPROM), and Electrically Erasable Programmable ROM (EEPROM), a volatile memory device, such as Random Access Memory (RAM), or a storage medium, such as Hard Disk Drive (HDD) and Compact Disk (CD) ROM, without being limited thereto. The storage 330 may be a memory implemented in a chip separate from the processor described above in connection with the controller 320, and may be implemented as a single chip with the processor.

The vehicle 1 may further include the inputter 410 for receiving an operation command of at least one of a plurality of functions that can be performed in the vehicle 1. The vehicle 1 may further include the display 420 for displaying information about the function being performed, information input by the user, and communication error information. The vehicle 1 may further include a sound outputter for outputting information about the function being performed as a sound.

The inputter 410 may be provided in a head unit or a center fascia and may include at least one mechanical button, such as ON/OFF buttons for operation of various functions, buttons to change settings of various functions, etc.

The inputter 410 may be provided in a jog dial or a touch pad for inputting a movement command and a selection command of a cursor displayed on a display of a terminal.

The inputter 410 may receive an output command for identifying error information and a transmission command for transmitting the error information.

The display 420 may display the error information. Here, the error information may include identification information and an error code of the controller in which the error occurred, and may further include an error code name.

The display 420 may also display the number of distortions of the output signal of the resolver 200.

The display 420 may also display the failure information corresponding to the distortion of the output signal of the resolver 200. For example, the display 420 may display inspection information for the external noise input.

The display 420 may be a flat panel display device, such as a liquid crystal display (LCD), an organic light emitting diode (OLED), or a plasma display panel (PDP).

A vehicle terminal may be provided in the vehicle 1, and the inputter 410 and the display 420 is inputter and display provided in the terminal.

The inputter of the terminal may include a touch panel integrally provided in the display of the terminal.

The inputter of the terminal may be activated and displayed in a button shape on the display of the terminal, and position information of the displayed button is inputted.

The inputter and display of the terminal may be provided with a touch screen.

The display of the terminal may also display location information of a service center.

Figure 12:
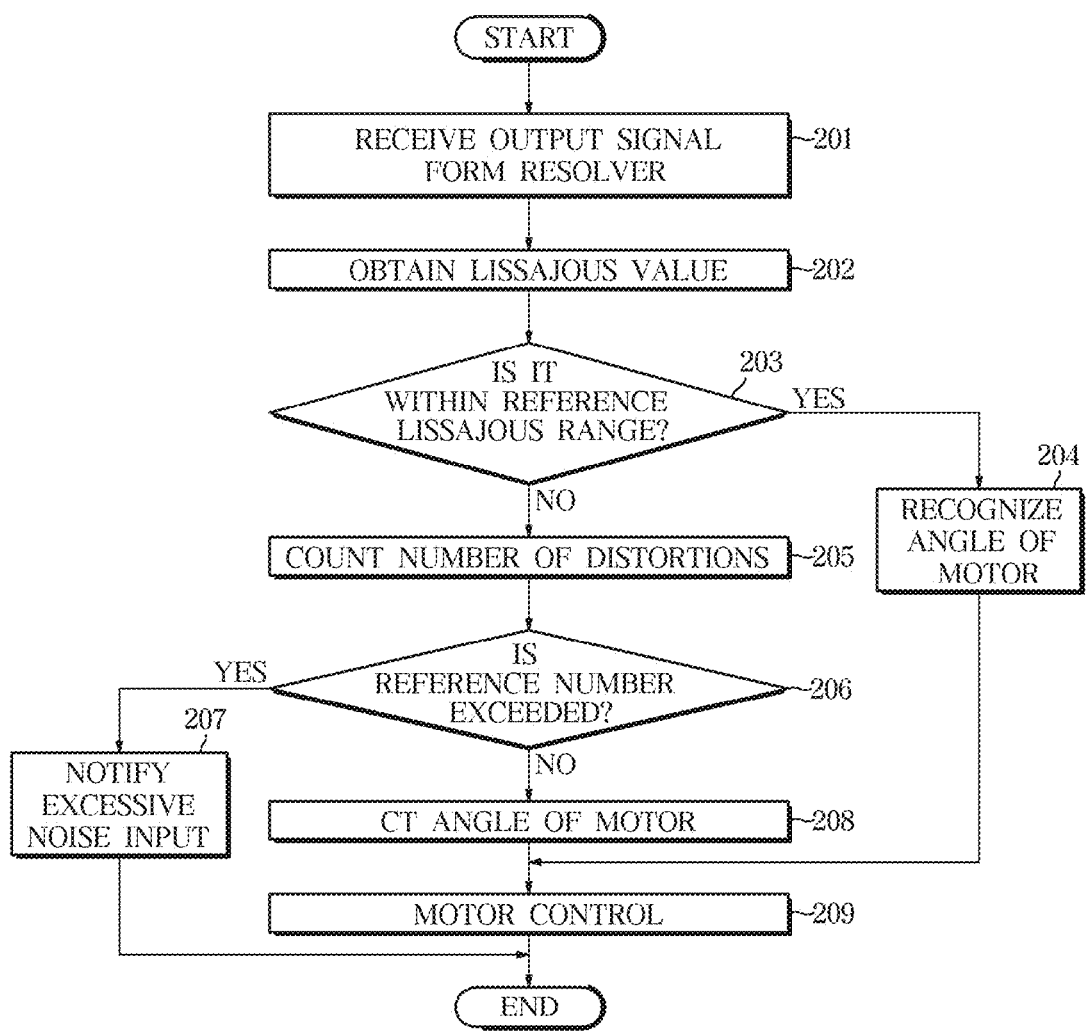
FIG. 12 is a control flowchart of a vehicle having a motor control device according to an embodiment.

FIG. 12 is a control flowchart of a vehicle having a motor control device according to an embodiment.

The vehicle 1 may obtain the driver's driving request based on the information about pressure on the accelerator pedal and the brake pedal while the vehicle 1 is driving, and control the speed of the motor 140 so that acceleration, deceleration, stop, or braking is performed in response to the driving request.

The vehicle 1 may receive the output signal output from the resolver 200 during the speed control of the motor 140 (201), recognize the rotation angle of the motor 140 (or the angle of the motor) based on the received output signal, obtain an actual speed of the motor 140 based on the recognized rotation angle of the motor 140, and control the voltage and current applied to the motor 140 so that the obtained actual speed of the motor 140 reaches the target speed corresponding to the driver's driving request.

The vehicle 1 may determine whether the output signal of the resolver 200 is distorted by the noise when recognizing the rotation angle of the motor 140 from the output signal of the resolver 200.

More particularly, the vehicle 1 may obtain the Lissajous value corresponding to the output signal of the resolver 200 (202), determine whether the obtained Lissajous value is within the reference Lissajous range (203), recognize the angle of the motor 140 based on the obtained Lissajous value when it is determined that the obtained Lissajous value is within the reference Lissajous range (204), and control the speed of the motor 140 based on the recognized angle of the motor 140 (209).

When recognizing the angle of the motor 140, the vehicle 1 may control the sine and cosine values using ATO (or RDC).

On the other hand, when it is determined that the obtained Lissajous value is out of the reference Lissajous range, the vehicle 1 may determine that the output signal of the resolver 200 is distorted and count the number of distortions of the output signal of the resolver 200 (205).

The vehicle 1 may compare the counted number of distortions with the reference number, and determine whether the counted number of distortions exceeds the reference number (206).

When it is determined that the counted number of distortions exceeds the reference number, the vehicle 1 may notify an excessive noise is input through the display 420 of the vehicle 1 (207).

The vehicle 1 may display the failure information indicating to visit a service center when the excessive noise is input.

In addition, the vehicle 1 may also output the sound corresponding to the notification of the excessive noise input through the sound outputter.

The vehicle 1 may predict the angle of the motor 140 based on the previously obtained Lissajous values and the currently obtained Lissajous value when it is determined that the counted number of distortions is less than the reference value (208), and control the speed of the motor 140 based on the recognized angle of the motor 140 (209).

Here, the configuration for predicting the angle of the motor 140 will not be described in detail as described in the configuration of the controller 320 (see FIGS. 9, 10, 11A and 11B).

As is apparent from the above description, the embodiments of the disclosure may preset and store a Lissajous map corresponding to the output signal of the resolver capable of stable control of the motor, and may strongly output the output signal of the resolver against noise by replacing the output signal with the reference data (V_cos, V_sin) corresponding to the Lissajous map in real time when the distorted output signal deviating from the Lissajous map is received by the external noise in the process of receiving the output signal of the resolver and recognizing the angle of the motor. In embodiment, the disclosure may secure the stability of the output signal of the resolver with respect to the external noise.

Therefore, it is not necessary to widen the distance between the motor and the housing beyond a certain distance, and it is not necessary to use a cover that structurally shields the resolver, thereby making it possible to reduce the size and weight, and to reduce the manufacturing costs and weight.

The disclosure eliminates the need to use a filter (LPF/BPF) for noise elimination, thereby preventing delay of the output signal of the resolver.

The disclosure may secure the current control stability of the motor by controlling the speed of the motor using the output signal of the stable resolver and mass production of eco-friendly vehicles with the increased control technology.

Further, when the number of distortions of the output signal (Count_noise) is monitored and the counted number exceeds the reference number, the disclosure may easily confirm a failure of the vehicle by transmitting the failure information to the driver and a developer, and enable a quick check so that the user can stably operate the vehicle.

As described above, the disclosure may improve the quality and merchantability of the eco-friendly vehicles, further increase the satisfaction of the user, improve the convenience of the user and the safety of the vehicle, and secure the competitiveness of the product.

Meanwhile, the disclosed embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Embodiments of the disclosure have thus far been described with reference to the accompanying drawings. It will be obvious to those of ordinary skill in the art that the disclosure may be practiced in other forms than the embodiments as described above without changing the technical idea or essential features of the disclosure. The above embodiments are only by way of example, and should not be interpreted in a limited sense.

What is claimed is:
1. A motor control device comprising:
a storage configured to store reference Lissajous values; and
a controller configured to:
apply an excitation signal to a resolver;
receive an output signal output from the resolver;
obtain a Lissajous value corresponding to the received output signal;
determine that an external noise is input when the obtained Lissajous value is different from the reference Lissajous values; and
control driving of a motor based on the obtained Lissajous value when the obtained Lissajous value is equal to any one of the reference Lissajous values,
wherein the controller is configured to:
periodically receive the output signal output from the resolver during driving of the motor;
sequentially obtain Lissajous values corresponding to the periodically received output signals;
obtain an angular acceleration between the adjacent Lissajous values among the sequentially obtained Lissajous values;
when a first one of the obtained Lissajous values is different from the reference Lissajous values, identify first and second angular acceleration values that respectively corresponding to the first obtained Lissajous value and a second obtained Lissajous value which is one of the obtained Lissajous values prior to the first Lissajous value;

determine one of the reference Lissajous values constituting a reference Lissajous curve based on the identified first and second angular accelerations;
recognize an angle of the motor based on the determined reference Lissajous value; and
control the driving of the motor based on the recognized angle of the motor.

2. The motor control device according to claim 1, wherein the controller is configured to:
count the number of distortions in which the output signal is distorted by the external noise during driving of the motor; and
output notification information of an excessive noise input to an external device when the counted number of distortions exceeds a reference number.

3. The motor control device according to claim 1, wherein the controller is configured to:
recognize angles between the adjacent Lissajous values among the sequentially obtained Lissajous values when obtaining the angular acceleration between the adjacent Lissajous values among the sequentially obtained Lissajous values;
obtain angular velocities between the recognized angles; and
obtain the angular acceleration between the recognized angular velocities.

4. The motor control device according to claim 1, wherein the controller is configured to:
recognize angles between the adjacent Lissajous values among the sequentially obtained Lissajous values when obtaining the angular acceleration between the adjacent Lissajous values among the sequentially obtained Lissajous values;
when two output signals are received from the resolver during normal driving of the motor, convert the two received output signals into a sine signal and a cosine signal by connecting peak points of the two received output signals;
digitize the converted sine signal and cosine signal;
obtain a position value of a central point of a reference Lissajous based on average values of sine values and cosine values obtained by sampling the digitized sine signal and cosine signal every predetermined period;
obtain a radius of the reference Lissajous based on the digitized sine value, the sine value of the obtained position value of the central point, the digitized cosine value, and the cosine value of the obtained position value of the central point; and
obtain and store the reference Lissajous curve based on the obtained position value of the central point and the radius.

5. The motor control device according to claim 4, wherein the controller is configured to obtain the reference Lissajous value constituting the reference Lissajous curve based on the obtained position value of the central point and the radius.

6. A vehicle comprising:
a motor configured to transmit a driving force to wheels;
a resolver connected to the motor; and
a motor control device configured to:
apply an excitation signal to the resolver;
receive an output signal output from the resolver;
obtain a Lissajous value corresponding to the received output signal;
determine that an external noise is input when the obtained Lissajous value is out of a pre-stored reference Lissajous range; and
control driving of the motor based on the obtained Lissajous value when the obtained Lissajous value is within the pre-stored reference Lissajous range,
wherein the motor control device is configured to:
periodically receive the output signal output from the resolver during driving of the motor;
sequentially obtain Lissajous values corresponding to the periodically received output signals;
obtain an angular acceleration between the adjacent Lissajous values among the sequentially obtained Lissajous values;
when the obtained Lissajous value is out of a pre-stored reference Lissajous range, determine one of reference Lissajous values constituting a reference Lissajous curve based on the obtained angular accelerations;
recognize an angle of the motor based on the determined reference Lissajous value.

7. The vehicle according to claim 6, further comprising:
a battery configured to transmit power to the motor and to be charged by regenerative braking of the motor.

8. The vehicle according to claim 6, further comprising:
a display,
wherein the motor control device is configured to:
count the number of distortions in which the output signal is distorted by the external noise during driving of the motor; and
output notification information of an excessive noise input to an external device when the counted number of distortions exceeds a reference number.

9. The vehicle according to claim 8, wherein the motor control device is configured to:
determine one of reference Lissajous values constituting a pre-stored reference Lissajous curve when the counted number of distortions is equal to or less than the reference number;
recognize an angle of the motor based on the determined reference Lissajous value; and
control the driving of the motor based on the recognized angle of the motor.

10. The vehicle according to claim 6, wherein the motor control device is configured to:
periodically receive the output signal output from the resolver during driving of the motor;
sequentially obtain Lissajous values corresponding to the periodically received output signals;
obtain an angular acceleration between the adjacent Lissajous values among the sequentially obtained Lissajous values;
identify a first angular acceleration corresponding to the received Lissajous value before any one of the Lissajous values is received when one of the Lissajous values is out of the reference Lissajous range;
identify a second angular acceleration corresponding to one of the Lissajous values;
when the obtained Lissajous value is out of the pre-stored reference Lissajous range, determine one of reference Lissajous values constituting a reference Lissajous curve based on the identified first and second angular accelerations;
recognize an angle of the motor based on the determined reference Lissajous value; and
control the driving of the motor based on the recognized angle of the motor.

11. The vehicle according to claim 10, wherein the motor control device is configured to:

recognize angles between the adjacent Lissajous values among the sequentially obtained Lissajous values when obtaining the angular acceleration between the adjacent Lissajous values among the sequentially obtained Lissajous values;

obtain angular velocities between the recognized angles; and obtain the angular acceleration between the recognized angular velocities.

12. The vehicle according to claim 6, wherein the motor control device is configured to:

recognize angles between the adjacent Lissajous values among the sequentially obtained Lissajous values when obtaining the angular acceleration between the adjacent Lissajous values among the sequentially obtained Lissajous values;

when two output signals are received from the resolver during normal driving of the motor, convert the two received output signals into a sine signal and a cosine signal by connecting peak points of the two received output signals;

digitize the converted sine signal and cosine signal;

obtain a position value of a central point of a reference Lissajous based on average values of sine values and cosine values obtained by sampling the digitized sine signal and cosine signal every predetermined period;

obtain a radius of the reference Lissajous based on the digitized sine value, the sine value of the obtained position value of the central point, the digitized cosine value, and the cosine value of the obtained position value of the central point; and obtain and store the reference Lissajous curve based on the obtained position value of the central point and the radius.

13. The vehicle according to claim 12, wherein the motor control device is configured to obtain a reference Lissajous value constituting the reference Lissajous curve based on the obtained position value of the central point and the radius.

14. A method of controlling a vehicle, the vehicle including a motor, a resolver, and a battery, the method comprising:

when an output signal output from the resolver is received during driving of the motor, by a controller, obtaining a Lissajous value corresponding to the received output signal;

determining, by the controller, that an external noise is input when the obtained Lissajous value is out of a pre-stored reference Lissajous range; and controlling, by the controller, the driving of the motor based on the obtained Lissajous value when the obtained Lissajous value is within the pre-stored reference Lissajous range, wherein determining comprises:

periodically receiving the output signal output from the resolver during driving of the motor;

sequentially obtaining Lissajous values corresponding to the periodically received output signals;

obtaining an angular acceleration between the adjacent Lissajous values among the sequentially obtained Lissajous values; and when the obtained Lissajous value is out of the pre-stored reference Lissajous range, identifying the selected reference Lissajous value among the reference Lissajous values constituting the reference Lissajous curve based on the obtained angular accelerations.

15. The method according to claim 14, wherein the determining of that the external noise is input when the obtained Lissajous value is out of the pre-stored reference Lissajous range comprises:

counting the number of distortions in which the output signal is distorted by the external noise; and displaying notification information of an excessive noise input to an external device through a display when the counted number of distortions exceeds a reference number.

16. The method according to claim 15, wherein the determining of that the external noise is input when the obtained Lissajous value is out of the pre-stored reference Lissajous range comprises:

determining one of reference Lissajous values constituting a pre-stored reference Lissajous curve when the counted number of distortions is equal to or less than the reference number; and recognizing an angle of the motor based on the determined reference Lissajous value.

17. The method according to claim 14, wherein the obtaining of the angular acceleration between the adjacent Lissajous values among the sequentially obtained Lissajous values comprises:

recognizing angles between the adjacent Lissajous values among the sequentially obtained Lissajous values;

obtaining angular velocities between the recognized angles; and obtaining the angular acceleration between the recognized angular velocities.

18. The method according to claim 14, wherein determining comprises:

identifying a first angular acceleration corresponding to the received Lissajous value before the obtained Lissajous values is received;

identifying a second angular acceleration corresponding to the obtained Lissajous values; and identifying the selected reference Lissajous value among the reference Lissajous values constituting the reference Lissajous curve based on the identified first and second angular accelerations.

* * * * *